(12) United States Patent
Shabtai et al.

(10) Patent No.: US 7,587,454 B2
(45) Date of Patent: Sep. 8, 2009

(54) VIDEO STREAMING PARAMETER OPTIMIZATION AND QOS

(75) Inventors: Mordechai Shabtai, Rosh HaAyin (IL); Daphna Levi, Tel-Mond (IL); Guy Lorman, Kfar-Saba (IL)

(73) Assignee: Nice Systems Ltd., Raanana (IL)

( * ) Notice: Subject to any disclaimer, the term of this patent is extended or adjusted under 35 U.S.C. 154(b) by 796 days.

(21) Appl. No.: 11/006,575

(22) Filed: Dec. 8, 2004

(65) Prior Publication Data

US 2006/0136597 A1 Jun. 22, 2006

(51) Int. Cl.
*G06F 15/13* (2006.01)

(52) U.S. Cl. .................. 709/205; 709/224; 709/225; 709/226; 709/229; 709/231; 709/241; 348/153; 348/154; 348/155; 348/159

(58) Field of Classification Search .................. 709/224, 709/225, 229, 205, 226, 231, 241; 348/153, 348/154, 155, 159
See application file for complete search history.

(56) References Cited

U.S. PATENT DOCUMENTS

2001/0034786 A1* 10/2001 Baumeister et al. ......... 709/231
2003/0059096 A1   3/2003 Dekel et al.
2003/0236837 A1* 12/2003 Johnson et al. ............. 709/205
2004/0039820 A1*  2/2004 Colby et al. ................ 709/226
2005/0005025 A1*  1/2005 Harville et al. ............. 709/241
2006/0088092 A1*  4/2006 Chen et al. ............. 375/240.01

FOREIGN PATENT DOCUMENTS

WO   WO 2006/021943   3/2006

OTHER PUBLICATIONS

Ramanujan et al. "Asaptive Streaming of MPEG Video Over IP Networks", Proceedings of the 22nd Annual Conference on Local Computer Networks, IEEE Computer Society, USA, p. 398-409, 1997. p. 398, l-h col., Line 1—p. 400, r-h col., Line 18, p. 401, l-h col., § 3—p. 402, r-h col., § 3.2, p. 403, l-h col., §3.3 p. 406, r-h col., Line 7, p. 406, r-h col., Lines 50-Last Line, p. 409, l-h col., Lines One, Before, Last—r-h col., Line 5.

* cited by examiner

*Primary Examiner*—Jinsong Hu
(74) *Attorney, Agent, or Firm*—Pearl Cohen Zedek Latzer, LLP

(57) ABSTRACT

A data streaming system comprises: one or more streaming sources, one or more streaming clients, a network connecting said streaming sources and said clients, and a level of service selector able for each data stream to monitor the network, the respective streaming source and the respective streaming client to control streaming to the respective streaming client to define a level of service of the data stream. For a video stream the level of service may define the frame rate, the resolution, the overall quality or a level of masking used.

17 Claims, 5 Drawing Sheets

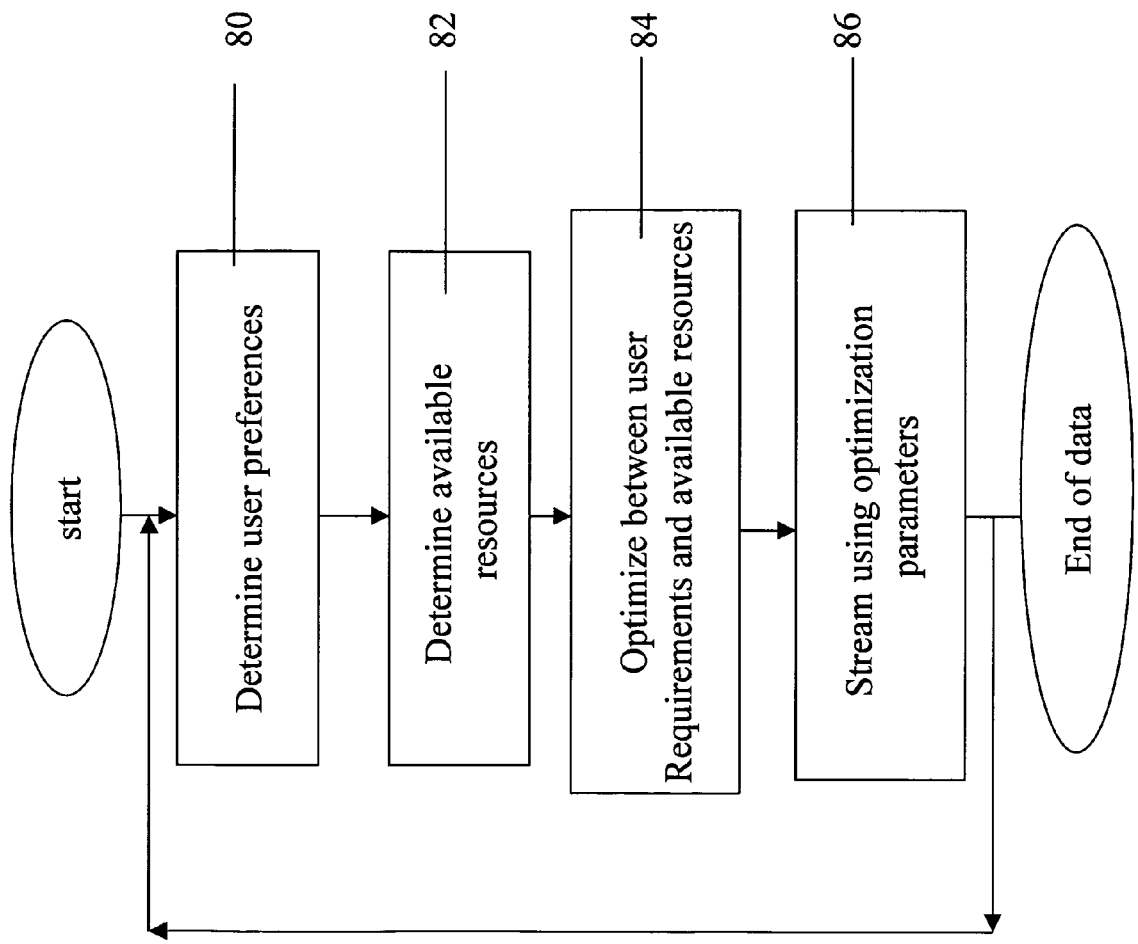

VIDEO STREAMING PARAMETER OPTIMIZATION AND QOS

FIELD AND BACKGROUND OF THE INVENTION

The present invention relates to video streaming parameter optimization and its use in meeting quality of service requirements.

Video streaming is widely carried, out over networks and can be carried out using widely varying parameters, such as frame rate, resolution, delay, compression and the like. It is further known to vary the streaming parameters dynamically depending on network conditions. This is known as load balancing. It is for example possible to compress a video stream to various levels, or to provide different resolutions or frame rates. Conditions on the network are then dynamically followed and one of the streams is selected in accordance with the current load conditions on the network. Numerous systems of load balancing are available.

Furthermore it is known to offer, a user a choice of streams to select depending on the bandwidth of his connection. For example a stream is offered for users having a broadband connection and another stream is offered for users having a dialup connection which is of much lower capacity. The user simply clicks for his choice depending on his connection bandwidth. Subsequently, dynamic load balancing may modify the initially chosen stream depending on the dynamic conditions of the network.

In general it is the aim of all load balancing systems to provide each user with the best overall level or quality of service (QoS) that the connection will provide. Furthermore the known load balancing systems generally take into account capacity issues of the connection.

However, load balancing simply deals with network issues such as connection capacity and is only interested in providing continued service to its customers whatever the connection conditions. Load balancing does not take into account issues at the sending or receiving end or requirements for particular kinds of services. Thus, in some cases the user does not want the best overall service, but rather is interested in the enhancement of specific parameters. For example, if the stream is a live stream from a remote control camera that the user is operating, then it is very important that the delay is minimized so that he receives immediate feedback on his control operations, and this overrides any requirements for the resolution or frame rate. If on the other hand the stream is from a storage unit, and is not live and feedback issues do not apply, then delay is a less relevant parameter than those of frame rate and resolution. Again if the stream is one of multiple streams from various security cameras which are being displayed simultaneously at the monitor of a security guard, then resolution and frame rate are probably not that important since the computer of the security guard probably does not have the processing power for simultaneous processing of multiple high resolution or high frame rate streams. The security guard would probably be satisfied with several low resolution streams and the ability to move to a higher resolution on one of the streams as and when a situation of interest arises. The known load balancing systems do not address these issues.

More specifically, with the use of video, the following limitations affect the quality of the video signal as it is transferred over a network, utilized or stored, namely:

The network overall bandwidth Network load.
Network bandwidth load

CPU power at the receiver side to enable the receiver side to decode video information.

CPU limitations at the sender side, the sender being required to send multiple streams from the same machine.

Overall storage needs.

The general requirement to get the best video quality available for a specific client in a particular time based on the client preferences.

Load balancing tends to deal only with the first of the above issues, being completely blind to issues at the sending end, at the receiving end, storage issues and the best video quality as per the requirements of an individual user.

SUMMARY OF THE INVENTION

According to one aspect of the present invention there is provided a data streaming system comprising:

a streaming source, at least one streaming client, a network connecting said streaming source and said client, and a level of service selector configured to monitor said network, said streaming source and said at least one streaming client to control streaming to said at least one streaming client by said streaming source to define a level of service of said streaming.

Preferably, said level of service selector further comprises:

a viewer preference holding unit for holding viewer end preferences of said at least one streaming client;

a resource unit for holding resource availability details of said streaming source, said network and said at least one streaming client; and an optimizer, associated with said resource unit, and said viewer preference unit for optimizing said level of service for said viewer end streaming preferences and for resource availability levels,.

Preferably, said network has an available capacity and wherein said optimizing comprises using said available capacity up to a level at which a maximum level of service defined by said viewer end preferences is met.

Preferably, said resource availability details comprise resources of any one of said streaming source, a connection, an intermediate server, a streaming channel, said network, processing capacity at said at least one streaming client and viewing capacity at said at least one streaming client.

Preferably, said resource availability details comprise resources of any two of said streaming source, a connection, an intermediate server, a streaming channel, said network, processing capacity at said at least one streaming client, and viewing capacity at said at least one streaming client.

Preferably, said resource availability details comprise resources of each of said streaming source, a connection, a streaming channel, said network, processing capacity at said at least one streaming client, and viewing capacity at said at least one streaming client.

Preferably, said level of service parameters comprise any one of frame rate, overall quality, compression level, masking level, masking formula, frame resolution, delay and inclusion or exclusion of metadata.

Preferably, said data is 4CIF video data comprising two fields, and said level of service parameters comprise a selection between streaming one field and streaming both fields.

Preferably, said data comprises separatable video and metadata, and said level of service parameters comprise a parameter for streaming or not streaming said metadata with said video.

Preferably, said data is a live video stream from a user controllable camera, and wherein said optimization comprises minimizing a delay parameter at the expense of other level of service parameters.

Preferably, said viewer end preferences are predetermined for said at least one streaming client.

Preferably, said viewer end preferences are set with predetermined starting values and a user override for user controlled dynamic modification.

Preferably, said viewer end preferences are dynamically set during streaming via a modification algorithm.

Preferably, said dynamic modification algorithm is set to use cues from content of said data to modify said preferences.

Preferably, said modification algorithm is set to modify said preferences in response to triggers derived from sensors associated with a video source.

Preferably, said dynamic modification algorithm is set to use changes in channel capacity to modify said preferences.

Preferably, said viewer end preferences comprise predetermined starting values and are dynamically changed during streaming via a modification algorithm.

Preferably, said level of service selector is configured to manage a plurality of data streams to a plurality of streaming clients and to set a level of service independently for each data stream.

According to a second aspect of the present invention there is provided a method of managing a data stream being streamed from a streaming source to a client via a network, the method comprising:

determining client preferences for a level of service of said data stream, determining client capacity limitations for processing said data stream, determining network limitations for streaming said data, determining capacity limitations at the streaming source for processing said data stream, and optimizing said streaming to provide a level of service that fulfils said client preferences within at least one of said client, network, and streaming source capacity limitations.

The method preferably comprises altering said streaming dynamically as said client preferences and said client, said network, and streaming source capacity limitations change.

Preferably, said altering is carried out in response to cues from content of said data streaming.

Preferably, said altering is carried out in response to feedback from a user.

Preferably, said streaming is video streaming and said optimizing comprises changing at least one of:

frame rate, resolution, overall image quality, and a mask for masking less significant data.

Preferably, changing said frame rate comprises skipping frames.

Preferably, said data is encoded as a low resolution and at least one high resolution field and said changing resolution comprises changing between sending and not sending said at least one high resolution field.

Preferably, said data is encoded at a predetermined resolution and said changing said resolution comprises decoding said data and re-encoding at a requested new resolution.

Preferably, changing said mask comprises providing a new mask, decoding said streaming data and re-encoding said streaming data using said new mask.

The method preferably comprises altering a required level of service dynamically, detecting changes in available channel capacity and reoptimizing said streaming accordingly.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case,.selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a simplified flow chart illustrating the sequence of operations in setting streaming parameters using a level of service selector according to a preferred embodiment of the present invention.

DESCRIPTION OF THE PREFERRED EMBODIMENTS

Figure 1:
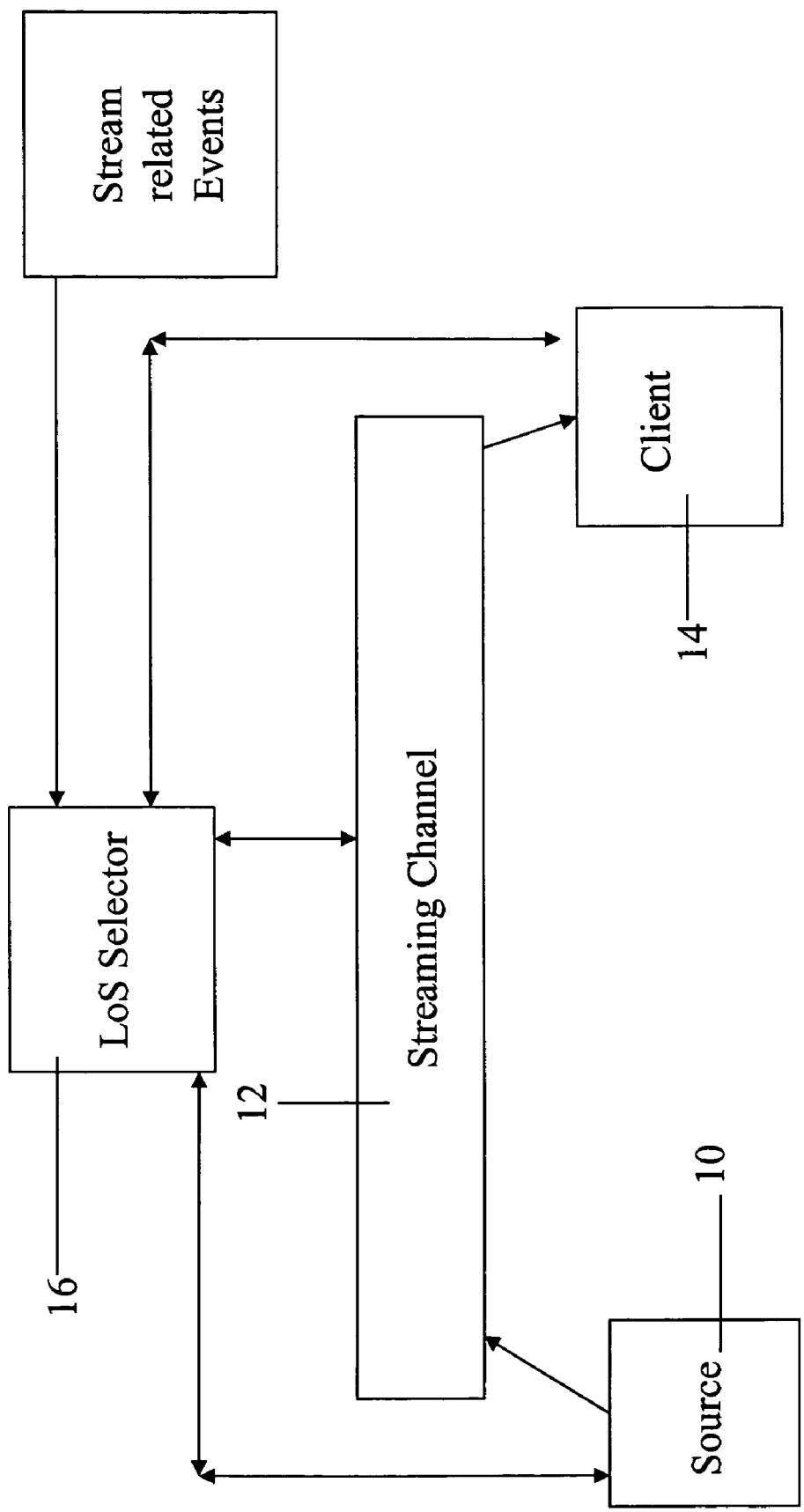
FIG. 1 is a simplified block diagram showing a system having a streaming source, a channel, a viewer -end, and a level of service selector, according to a first preferred embodiment of the present invention.

The present embodiments comprise a data transmission system for streaming data from a source node to a destination node according to level of service parameters, wherein the level of service parameters are preferably based on preferences or capacity limitations selected at the destination node, capacity limitations at the sending node or otherwise changed dynamically, semi-dynamically or statically in accordance with changing conditions, including network conditions, taking into account for example user set preferences. Preferably the parameters are selected dynamically during the course of streaming. The data may be multimedia data and may involve a display at the destination node. The level of service parameters can be selected at the destination node to optimize for viewing requirements, processing capacity at the destination, output capacity at the source, channel capacity, delay and feedback times and the like.

More particularly, the present embodiments solve the problem dynamically, semi dynamically and/or statically by allowing different video parameters to be changed and adjusted to the environmental conditions, client conditions, and the sender server conditions.

Examples of parameters which have freedom of play and which can be used to provide freedom for adjustment to tailor the level of service include frame rate, resolution, over all quality, the masking of less significant data, and multi-level resolution of most significant areas.

All or part of the parameters having freedom of play can be used together: or separately depending on circumstances and may be operated according to the following:

Client Preferences

Non limiting examples of client preferences are as follows: The client prefers image Quality over Frame rate, or the client prefers a human object over a static background, or the client prefers frame rate over image quality, or the client prefers a real time image irrespective of the quality, or client preference of a selected video area.

Client Needs

Non limiting examples of client needs (as opposed to client preferences) are that the receiver device is a palm-top device with a maximum supported resolution of QCIF. Alternatively, the client network supports 2 MB maximum bandwidth. In either case there is no point sending a higher level of service since it cannot be used.

Quality Of Service Indications of Network Problems

For example the network capacity may suddenly fall, in which case the system can dynamically change the signal bandwidth.

CPU Problem Indication on the Client Side

For example the receiving device suddenly loses processing capacity, perhaps to another application, or perhaps to deal with a malfunction, and therefore cannot devote the same resources as before to processing the video stream. In some cases a hardware fault such as failure of a memory cache or RAM chip or a hard disk can affect processing capacity.

CPU Problem Indication on the Server Side

As with the client side so can the serving device lose capacity for the same kind of reasons.

The level of service algorithm of the present embodiments can provide play in the video streaming operation to meet the above issues by changing the streaming parameters in the following ways, for example using regular software or using a DSP on a hardware card.

Reducing the frame rate may be achieved in a number of ways, depending on the video encoding scheme. For example, when using a non-differential encoding scheme such as MJPEG, it is possible simply to skip frames. In a differential encoding scheme such as MPEG4, it is possible to skip all or part of the B-frames. It is noted that B-frames are those frames not required as the starting point for decoding any subsequent differential frames. It is also possible to send differential frames only.

As a further alternative for differential schemes, it is possible to achieve frame skipping by decoding and subsequently re-encoding at the desired frame rate In all of the above cases it is possible to achieve the result by allowing the client to request a specific stream at a desired frame rate to be supplied by the server.

It is possible to reduce resolution by a number of means, for example with the 4CIF encoding scheme, which stores low resolution data in a first field and high resolution data in a second field, it is possible not to send the second field, that is the field carrying the higher resolution information. In any scheme is always possible to decode the data and re-encode at the desired resolution, and any of the resolution reduction methods may be achieved by asking for a specific stream at the desired resolution to be supplied by the server. A further alternative is to use MPEG7, which enables variety of resolution from one stream, or using different streams from the same camera source.

It is possible to reduce overall quality by decoding and re-encoding at the desired overall quality level, and/or by allowing the client to ask the server for a specific stream at the desired overall quality to be supplied.

Changing the level of masking of less significant data may be achieved by changing of masking information used in the stream. It is then possible to decode the video stream using the old mask and re-encoding the video following masking with the new masking information.

Changes in masking can be initiated by asking for a specific stream in the desired masking formula to be supplied by the server.

The principles and operation of a data transmission system or streaming optimization system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram illustrating a generalized level of service selector for a video streaming channel providing video streaming in accordance with level of service parameters according to a first preferred embodiment of the present invention.

As illustrated in FIG. 1, a video streaming source 10, which may be a camera, or a group of cameras connected to a logger, or a storage device, is connected to a channel 12. The channel streams video from the source 10 to a client device 14 at a viewer end. The channel has an available capacity which typically changes over time. The viewer end also has a given capacity, for example it may be limited in its ability to process or display video data. Furthermore the streaming source has its own capacity limitations. The viewer end may also have viewing preferences such as certain viewing requirements, quality, delay frame rate, and the like. Thus a user may require a certain level of resolution or a certain frame rate. In particular the viewing preferences may change, during streaming. Thus if source device 10 is a security camera, a user may be happy with a low level of resolution and low frame rate most of the time, but may want to increase both resolution and frame rate following detection of movement near the camera or following a loud noise. Accordingly a level of service selector 16 is connected between the channel and the viewer end. The level of service selector is able to determine the preferences of the client device, and also requirements and maximum capacities of the client device. The level of service selector may also detect the available resources at the streaming source and over the channel, and is then able to provide parameters for streaming which optimize the use of the available resources to fulfill the requirements at the viewer end.

In particular the level of service selector is able to take into account dynamically changing requirements at the viewer end and dynamically changing conditions in the channel in order to modify the optimization. Furthermore the level of service selector is aware of the available processing capacity at the viewer end and does not ask for a greater capacity than the viewer end workstation is able to cope with.

Figure 2:
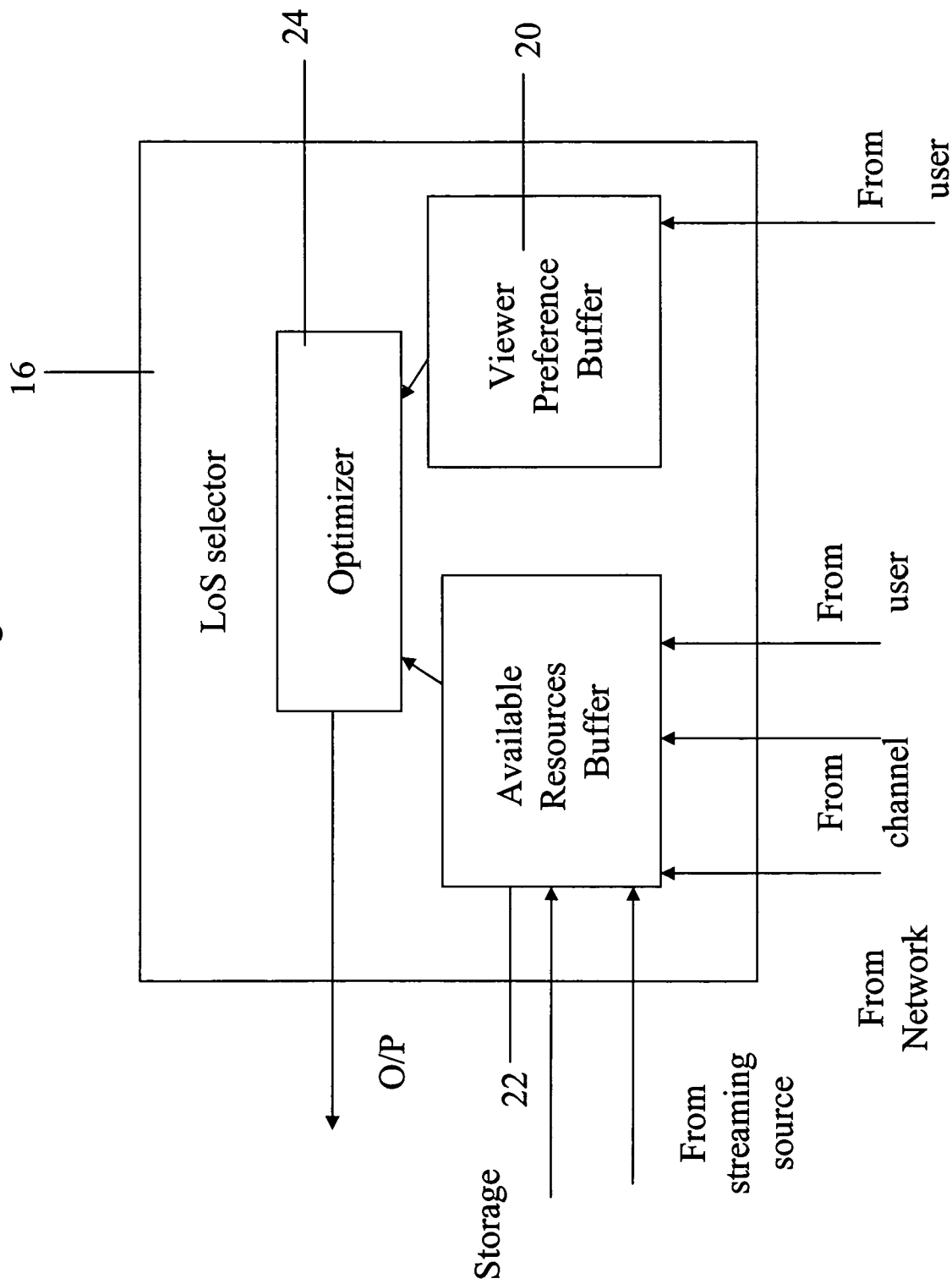
FIG. 2 is a simplified block diagram showing in greater detail the level of service selector of FIG. 1.

Reference is now made to FIG. 2 which shows in greater detail the level of service selector of FIG. 1. Level of service selector 16 comprises a viewer preference holding buffer 20 for holding viewer end preferences, such as required frame rate, resolution level, maximum desirable delay and the like. A resource buffer 22 holds resource availability details such as available channel capacity, source end processing capability, viewer end processing capability etc. Connected to both buffers is -an optimizer 24 which optimizes the level of service parameters for the viewer end streaming preferences and for resource availability levels.

The optimizer may for example set compression parameters, frame rate or resolution parameters or overall quality or masking level etc, or include or exclude metadata in order to increase or decrease bit rates or delay, or decode data and re-encode it to fit with the currently desired level of service.

The optimizer may for example select between low frame rate at low resolution, high frame rate at low resolution, low frame rate at high resolution, and high frame rate at high resolution, in accordance with requirements. In a case where a low delay is a priority, the optimizer typically ensures that the frame rate and resolution are set to the best that can be managed with the available resources without compromising the delay.

In the case of video cameras, compression or selection of resolution level or frame rate may be carried out at the individual cameras, or at loggers to which the cameras are connected. The loggers may be controllable to provide frame rates of different resolution, for example 2D, CIF, 4CIF, QCIF and the like. Control by the optimizer may simply consist of routing a given camera through a given logger.

Figure 3:
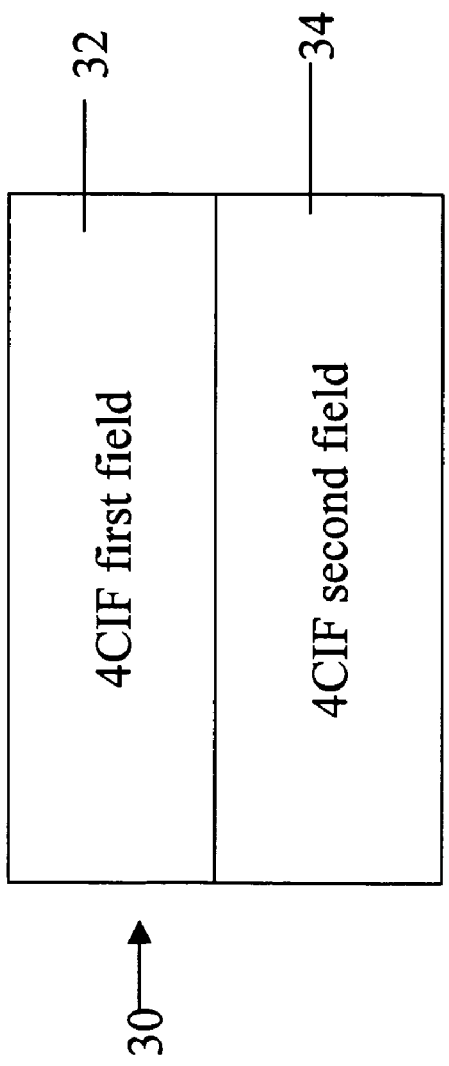
FIG. 3 is a simplified schematic diagram showing a data structure for a 4CIF data stream.

Reference is now made to FIG. 3 which is a simplified diagram showing in schematic form a 4CIF data structure 30 comprising two fields 32 and 34 for each frame. A complete frame can be reconstructed by using just the first field 32. The second field 34 increases the resolution. Hence, in the case of the video stream being a 4CIF stream comprising two fields as described, one of the options for controlling the bit rate is to select between streaming just the first field 32 and streaming both fields 32 and 34.

Figure 4:
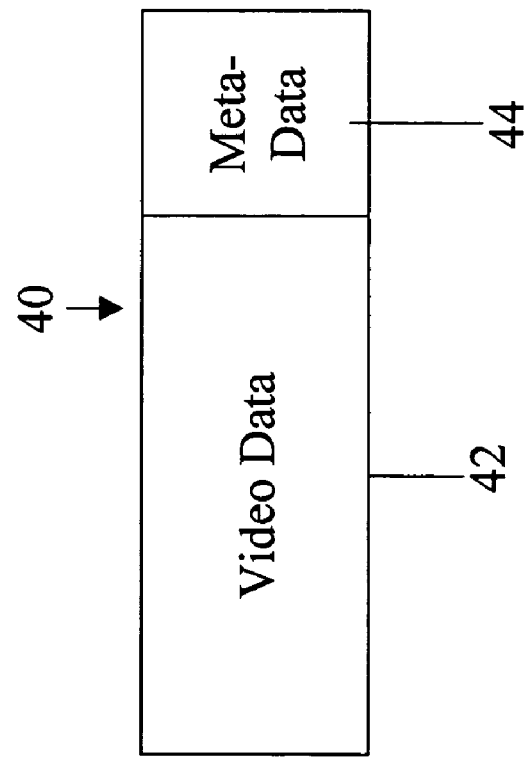
FIG. 4 is a simplified schematic diagram showing a data structure for MPEG 7 in which video data and metadata are stored separately.

Reference is now made to FIG. 4, which is a simplified diagram showing a data structure according to the MPEG 7 video compression standard. Structure 40 comprises a video streaming section 42 and a separate metadata section 44. Metadata or data about data, is control or labeling or other information about the accompanying video data. It is noted that metadata can often comprise up to 7% and more as the technology develops of the bit rate and is simply ignored by many applications. Hence, if the metadata is not needed then an automatic 7% increase in capacity is available simply by not transmitting parts of the metadata. The MPEG 4 standard as well as other video compression standards, provides separate encoding of the metadata, as illustrated, so that such non-transmission is simple to achieve.

In contrast with the prior art load balancing, optimizing with the optimizer 24 comprises using the available capacity, but only to the extent to which a level of service defined by the viewer preferences, application needs, and viewer processing capacity limitations, as well as sender end and network limitations, is met. Furthermore it permits the optimization to be modified for changing requirements at the viewer end. By contrast the prior art load balancing systems tend to try and use all of the capacity that is available, sending increased frame rate and/or resolution when the channel capacity becomes available and decreasing when it is not available. The user may at the most be asked about his connection rate so that high data rates are not sent to a dialup connection, but beyond that his local resources and requirements are ignored in load balancing.

Another way of altering the streaming parameters is by masking. Masking is taught inter alia in applicant's co-pending application PCT/IL04/00736, the contents of which are hereby incorporated herein by reference. Video data can be masked, for example to remove static backgrounds and the like, or to concentrate solely on the face of an intruder. Masking can result in great saving in capacity and the mask can be changed dynamically depending on requirements. For example the user client may specify a low resolution overall picture most of the time but when an intruder is seen it may want a high resolution image. Due to capacity limitations the entire image cannot be sent in high resolution but it may be possible to mask the background and provide a high resolution image of the face.

Figure 5:
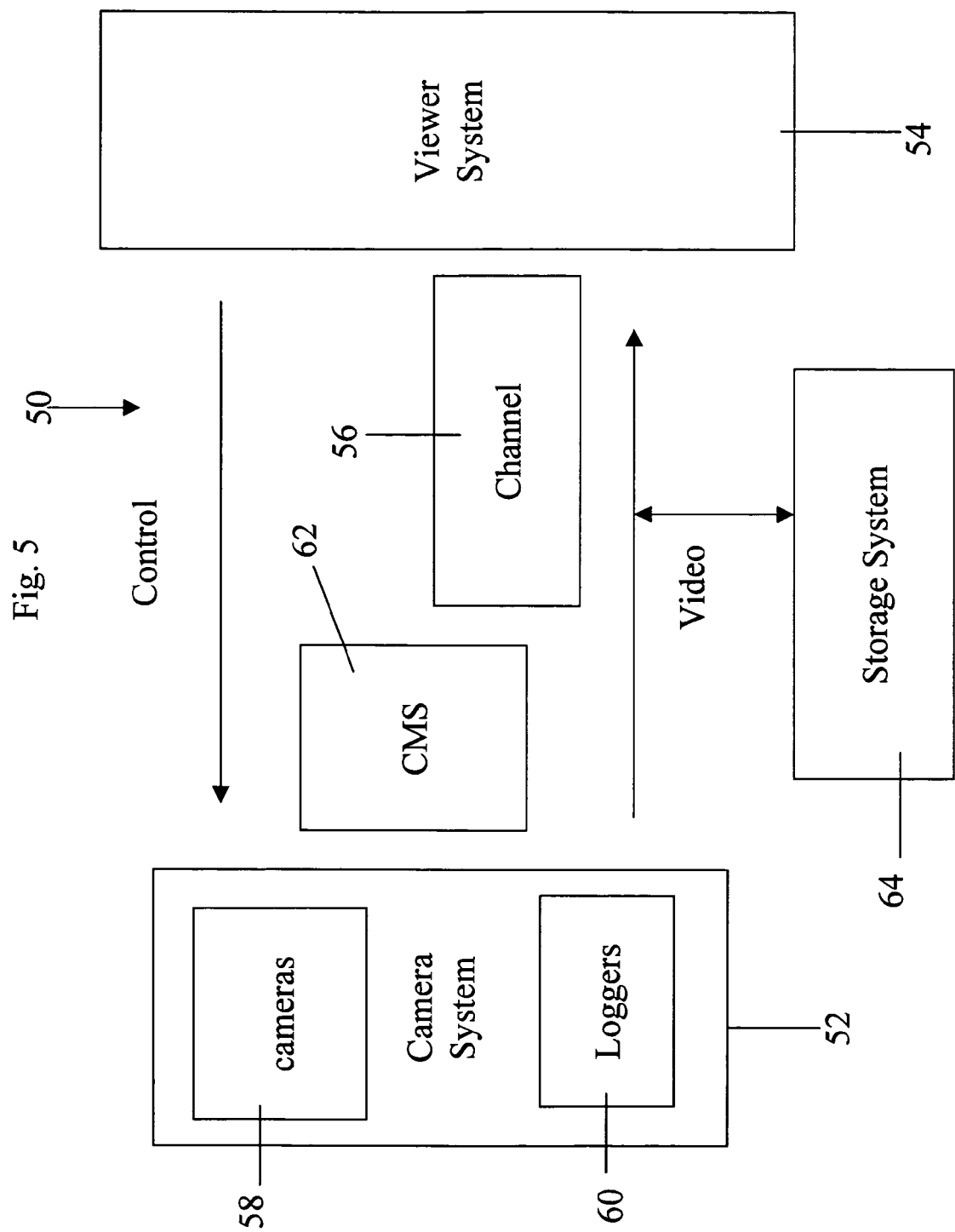
FIG. 5 is a simplified schematic diagram showing an integrated surveillance system using a level of service selector according to a preferred embodiment of the present invention.

Reference is now made to FIG. 5, which is a simplified diagram illustrating a layout for an integrated surveillance system according to a preferred embodiment of the present invention. Integrated surveillance system 50 comprises an on site camera system 52 which is an arrangement of CCTV cameras and logger devices. The on-site camera system 52 is connected to a viewer system 54, typically located at a remote operation room. The connection is via a limited resource connection which may be the telephone line or a dedicated line or an Internet connection or any other suitable connection. A network link 56 is set up over the connection to carry the video stream from the camera system and to send back control or other data as required.

Camera system 52 comprises cameras 58 and loggers 60. The cameras 58 collect the video data from the scene, possibly together with microphones for audio, or with other sensors, depending on the application. Similarly the cameras may be augmented with image intensifier or IR capabilities as necessary. The cameras may have on-board processing and/or storage ability, or they may output raw video data. The output from the video cameras is sent to loggers 60, where the data is stored and/or compressed or otherwise parameterized for the channel. Several cameras may share a single logger or a network of cameras may be connected to a network of loggers. The kinds of loggers used depend on the number of cameras connected thereto and the required output quality.

In one preferred embodiment the different loggers, having their own separate digital signal processors, (DSP) can be set independently to provide different streaming abilities. Thus one logger may be set to provide a CIF stream, and another 4CIF, so that sending the appropriate stream for the required resolution is simply a matter of routing the camera via the appropriately set logger.

In one embodiment a single camera output may be processed at different loggers to provide several different streams at different rates. Then the appropriate stream is chosen for the channel as and when required.

A call management system CMS 62, or middle tier is it is sometimes referred to, may be provided, typically one per remotely monitored site. The CMS knows each of the cameras on the site and each of the loggers as well as any data storage facilities and the viewing destinations, and it controls the connections so that the correct camera is routed through the appropriate logger to the appropriate destination. In an implementation the level of service selector simply tells the CMS 62 that it requires a given resolution, and the CMS routes the camera via the appropriate logger. The CMS thus provides one means of managing the level of service for the datastream, since it can receive parameter information, capacity information and user requirement information from streaming sources, intermediate servers and clients.

In one configuration, depending on the compression scheme being used, the compression parameters can be used to select a given level of service. Much video compression is based on an independent or I—(Intraframe) frame followed by a series of P or delta frames, in which only changes are recorded. Parameters that can be changed here are the frequency of I frames, the overall number of frames per second, and the overall resolution. However P frames cannot be dropped since later P frames use the preceding P frame as their reference point.

A further development, known in the widely used MPEG 4, uses B frames, which are additional frames inserted between P frames (or between I and P frames) and which themselves include delta information with respect to both preceding and following frames. B frames do not form the basis for delta information of other frames and therefore B frames can conveniently be dropped when capacity falls. Likewise B frames can be ignored in order to implement a fast forward function.

A typical frame sequence may thus be IBBPBBPBBPBBPBBPIBBPBBP with an I frame being sent around twice a second. Such a sequence could be reduced to IPPPPIPPPPP under the command of the level of service selector in order to suit the current conditions and requirements.

Storage system 64 can store data streams, for example in a hierarchy of different online and offline devices having different availabilities, and then provide them upon request. Such a storage system is a typical part of an integrated surveillance system, allowing data to be stored permanently or temporarily as desired for subsequent viewing. The storage system can be used in a number of modes. All data can be routed to the storage system, or only data manually marked for storage, or any data with a corresponding trigger, indicated as an event can be stored. Other modes will be apparent to the skilled person.

The level of service selector of the present embodiments allows video streaming parameters to be set and reset dynamically in accordance with the requirements or preferences of the viewer and limitations of the client device, the limitations of the streaming source and limitations on the network. In one configuration, particular viewer preferences are preset. For example, in cases where the camera is remotely controllable, say a pan tilt zoom (PTZ) camera, the remote operator who needs to control the camera, needs the delay to be kept to a minimum so that the picture provides real time feedback on use of the controls. In such a case the level of service selector raises or lowers the bit rate as capacity becomes available on the channel, but never beyond a level that prejudices the delay time.

The user is able to configure masking areas, multi-resolution areas and different masking formulae from his computer. Resolution step up and step down operations may then be designed into the system to fulfil the user's requests. In an alternative configuration the level of service may be increased following cues from the video content itself or from sensors accompanying the camera. Thus the camera may for example be accompanied by a movement or proximity sensor or a microphone. In the event of detection of movement, or of a loud noise for example, the channel may be automatically set to a high level of service. In a variation of this configuration the cue, or trigger, may be included as a tag with the video data as it is sent to storage, so that the point at which the suspicious activity occurred can easily be found later whilst searching.

In a further embodiment, specifically the data following a tag is stored.

In yet another configuration, the user preferences may be dynamically set during streaming via a modification algorithm. The modification algorithm may be application specific, for example it may ask for a higher level of service at different times of the day depending on changes in threat levels that depend on the time of day.

In a further configuration the modification algorithm may itself be set to use cues from content of the video streaming or from associated sensors to modify the preferences. Thus the algorithm may be set to almost ignore a loud noise in the middle of the day but will ask for a high level of service in response to such a noise late at night.

In a further configuration, masking techniques can be used on the video signal. For example it is possible to use readily available image processing to identify the location of a face on an image. When resources are lacking the rest of the image can be masked out and only the face, or the face and its immediate surroundings, need-be sent.

Furthermore, a hierarchy of masks can be set up, each with a different priority level, so that under highly stressed conditions, only the minimal essential information is sent, and as stress is reduced, meaning more resources become available, more and more information is sent.

Reference is now made to FIG. 6, which is a simplified flow chart illustrating a basic procedure for the preferred embodiments of the present invention. In FIG. 6, the viewer requirements are first obtained in a step 80. Subsequently the available resources, including the client resources, the network resources and the streaming source resources, are obtained in a step 82. Then in step 84, optimization is carried out to get as close as possible to the desired level of service with the available capacity. During the course of streaming, step 86, the parameters are reoptimized as channel conditions and the required level of service change. For example the channel capacity may change, or the client may request a higher level of service, as explained above.

It is expected that during the life of this patent many relevant data streaming devices and systems will be developed and the scope of the terms herein, particularly of the terms "streaming" and "video streaming", is intended to include all such new technologies a priori.

It is appreciated that certain features of the invention, which are, for clarity, described in the context of separate embodiments, may also be provided Din combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A surveillance system comprising:
a camera system including surveillance cameras;
at least one viewer system;
a network connecting said camera system and said viewer system; and
a level of service selector to control streaming of surveillance data captured by at least one of said surveillance cameras to said at least one viewer system according to viewer preferences and resource availability, wherein said selector comprising an optimizer to set parameters comprising compression parameters, frame rate parameters, resolution parameters and masking level parameters defining a desired level of service of said streaming that fulfils said viewer preferences and said resource availability,
wherein said resource availability comprise resource availability details pertaining to resources of each of said camera system, a connection, a streaming channel, said network, processing capacity at said at least one viewer system, and viewing capacity at said at least one viewer system.

2. The system of claim 1, wherein said level of service selector comprises:
a viewer preference unit for holding said viewer preferences, said viewer preferences comprising a delay parameter defining a maximum desired delay for receiving the streaming of surveillance data at said at least one viewer system; and
a resource unit for holding said resource availability details of said camera system, said network and said at least one viewer system, wherein said selector is able to adjust one or more frame rate parameters and one or more resolution parameter based on the delay parameter.

3. The system of claim 2, wherein said network has an available capacity and wherein said optimizer enables said available capacity up to a level at which a maximum level of service defined by said viewer preferences is met.

4. The system of claim 2, wherein said resource availability details comprise details pertaining to resources of any one of said camera system, a connection, an intermediate server, a streaming channel, said network, processing capacity at said at least one viewer system and viewing capacity at said at least one viewer system.

5. The system of claim 2, wherein said resource availability details comprise details pertaining to resources of any two of said camera system, surveillance cameras, a connection, an intermediate server, a streaming channel, said network, processing capacity at said at least one viewer system and viewing capacity at said at least one viewer system.

6. The system of claim 2, wherein said viewer preferences are predetermined for said at least one viewer system.

7. The system of claim 2, wherein said viewer preferences are set with predetermined starting values and are modifiable by a user.

8. The system of claim 2, wherein said viewer preferences are dynamically set during streaming via a modification algorithm.

9. The system of claim 8, wherein said modification algorithm is set to use cues from content of said data to modify said preferences.

10. The system of claim 8, wherein said modification algorithm is set to modify said preferences in response to triggers derived from sensors associated with the surveillance cameras.

11. The system of claim 8, wherein said modification algorithm is set to use changes in channel capacity to modify said preferences.

12. The system of claim 2, wherein said viewer preferences comprise predetermined starting values and are dynamically changed during streaming via a modification algorithm.

13. The system of claim 1, wherein said level of service parameters comprising frame rate, overall quality, compression level, masking level, masking formula, frame resolution, delay and inclusion or exclusion of metadata.

14. The system of claim 1, wherein said surveillance data is 4CIF video data comprising two fields, and a characteristic of said level of service is a selection between streaming one field and streaming both fields.

15. The system of claim 1, wherein said surveillance data comprises separable video and metadata, and a characteristic of said level of service is selection between streaming or not streaming said metadata with said video.

16. The system of claim 1, wherein said data is a live video stream from a user controllable camera, and wherein said optimizer is set to minimize a delay parameter at the expense of other level of service parameters.

17. The system of claim 1, wherein said level of service selector is configured to manage a plurality of data streams to a plurality of viewer systems and to set a level of service independently for each data stream.

* * * * *